No. 770,445. PATENTED SEPT. 20, 1904.
M. L. SENDERLING.
VEHICLE.
APPLICATION FILED JAN. 27, 1904.
NO MODEL.
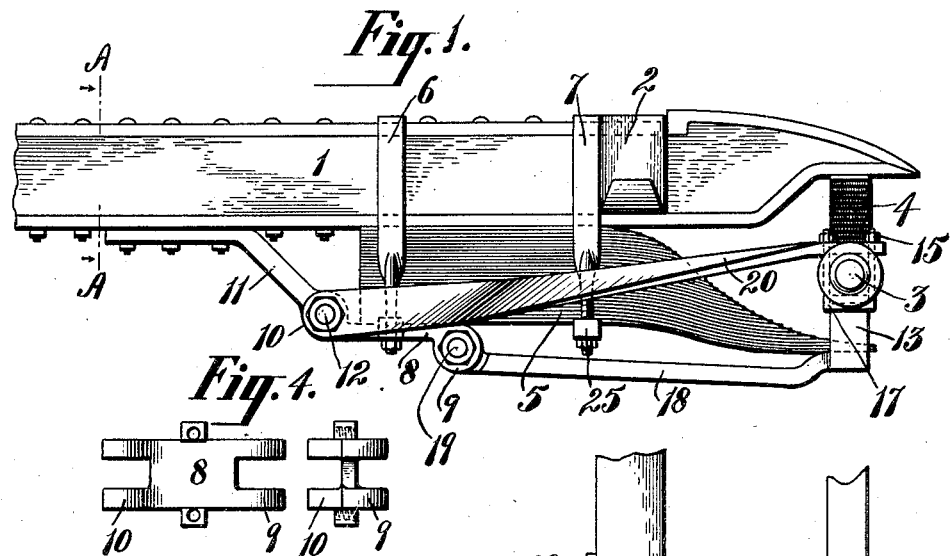
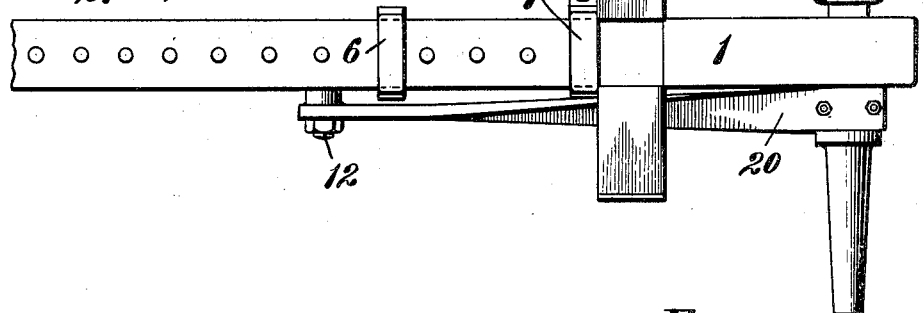
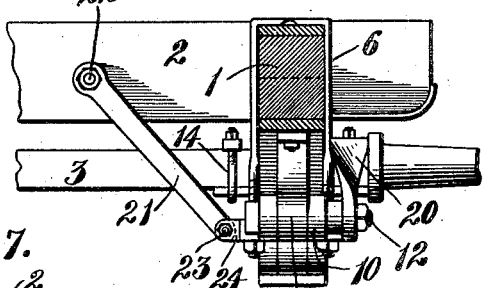
Witnesses: F. G. Hachenberg. Henry Theinl.
Inventor: M. L. Senderling by attorneys Brown & Seward No. 770,445. Patented September 20, 1904.

UNITED STATES PATENT OFFICE.

MARTIN L. SENDERLING, OF JERSEY CITY, NEW JERSEY.

VEHICLE.

SPECIFICATION forming part of Letters Patent No. 770,445, dated September 20, 1904.

Application filed January 27, 1904. Serial No. 190,843. (No model.)

*To all whom it may concern:*

Be it known that I, MARTIN L. SENDERLING, a citizen of the United States, and a resident of Jersey City, in the county of Hudson and State of New Jersey, have invented a new and useful Improvement in Vehicles, of which the following is a specification.

My invention relates to an improvement in vehicles, and has more particularly for its object to provide a novel connecting mechanism between the axle and another part of the vehicle whereby the springs which are secured to such other part of the vehicle may have a sliding engagement with the axle at points beneath the same.

A practical embodiment of my invention is represented in the accompanying drawings, in which—

Figure 1 represents in side elevation so much of a rear axle, a body-supporting side rail, and my improved connecting mechanism therefor as will give a clear understanding of the invention. Fig. 2 is a top plan view of the same. Fig. 3 is a transverse section taken in the plane of the line A A of Fig. 1 looking in the direction of the arrows. Fig. 4 represents in plan and end elevation one of the plates which are secured to the supporting-springs. Fig. 5 is a plan and side view of one of the side-rail clip-bars to which the transverse braces are attached. Fig. 6 is a bottom plan view of one of the braces which connect the axle with the supporting-spring; and Fig. 7 is a view in rear elevation, on a smaller scale, of the bottom frame, the rear axle, and the connections between the same.

As the connection between the rear axle and the body-supporting side rails is the same upon both sides of the vehicle, I will proceed to describe one complete connecting mechanism only. The body-supporting side rail is denoted by 1 and the rear cross-rail by 2. The rear axle is denoted by 3, and the transverse spring for partially supporting the rear ends of the side rails is denoted by 4. A supporting-spring 5 of the half-semi-elliptical type is fixed to the side rail 1 by means of clips 6 and 7, which embrace the side rail and the spring. A plate 8 is secured to the bottom of the spring 5 by the clip 6, which plate is provided with eyes or lugs 9 at its rear end and eyes or lugs 10 at its forward end. A short diagonal brace 11 is secured at one end to the arm of the side rail 1 and at its other end to the forward end of the plate 8 by means of a bolt 12, passing through the lugs or eyes 10 and the said brace 11. The free end of the spring 5 has a sliding connection with the axle at a point beneath the same by providing a loop-shackle 13, which is rigidly clamped to the rear axle 3 by the clips 14 15, which embrace the axle and also laterally-extended lugs 16 17 on the shackle 13. This shackle is provided with a forwardly-projected brace 18, the free end of which is hinged to the plate 8 by means of a bolt 19, which passes through the lugs or eyes 9 and the said brace 18. To still further strengthen the connection between the axle and the side bar, I provide an upper longitudinal brace 20, the rear end of which is rigidly clamped to the rear axle 3, preferably by one of the clips 14 15, which secure the loop-shackle 13 to the axle. The forward end of this upper longitudinal brace 20 is hinged to the plate 8 by means of the bolt 12, which secures the short diagonal brace 11 to the said plate. A diagonal transverse brace 21 is secured at its inner end to the transverse rail 2 by a clip-bar 22, and at its outer end it is secured by a bolt 23 to the lugs or ears 24 of the bottom plate 25 of the clip 7, which secures the supporting-spring 5 to the side rail.

The connection between the rear axle and side rail which I have herein described is very strong and flexible and will permit a yielding movement of the side bar without danger of the displacement of the several parts.

While I have shown and particularly described the springs as connected to the body-supporting side rails of a vehicle, it is to be understood that the said springs may be secured to any other part of the vehicle forward of the rear axle without departing from the spirit and scope of my invention, the gist of the invention consisting in the fact that the springs have a sliding engagement with the axle at points beneath the same.

It is evident that changes might be resorted to in the form, construction, and arrangement of the several parts without departing from the spirit and scope of my invention. Hence I do not wish to limit myself strictly to the structure herein set forth; but

What I claim is—

1. In a wagon, an axle, springs, a part to which the springs are secured, said springs having a sliding engagement with the axle beneath the same and means for connecting the said part and axle.

2. In a wagon, an axle, loop-shackles carried thereby, springs, a part to which the springs are secured, the said springs having a sliding engagement with said shackle beneath the axle and means for connecting said part and axle.

3. The combination with the body-supporting side rails and rear axle, of springs secured to the side rails forward of the axle and having a sliding engagement with the axle at points beneath the same and braces secured to the axle and side rails.

4. The combination with the body-supporting side rails and rear axle, of springs secured to the side rails forward of the axle and having a sliding engagement with the axle at points beneath the same and braces secured to the axle and hinged to the springs at points forward of the axle.

5. The combination with the body-supporting side rails and rear axle, of springs fixed to the side rails forward of the axle and having a sliding engagement with the axle at points beneath the same and braces secured to the axle at points above and below the axle and hinged to the springs at points forward of the axle.

6. The combination with the body-supporting side rails and rear axle, of springs fixed to the side rails forward of the axle and having a sliding engagement with the axle beneath the same, plates secured to the springs and braces secured to the axle at points above and below the axle and hinged to the said plates at points forward of the axle.

7. The combination with the body-supporting side rails and rear axle, of springs fixed to the side rails, loop-shackles in which the springs are fitted to slide beneath the axle and braces fixed to the axle and pivoted to the springs at points forward of the axle.

8. The combination with the body-supporting side rails, rear axle and loop-shackles on the rear axle, of supporting-springs fixed to the side rails and having a sliding engagement with said loop-shackles beneath the axle and braces fixed to the axle at points above and below the same and hinged to the spring at points forward of the axle.

9. The combination with the body-supporting side rails, rear axle and loop-shackles on the rear axle, of springs fixed to the side rails, and having a sliding engagement with said loop-shackles beneath the axle, plates secured to the springs, braces secured at points below the axle and hinged to the said plate and braces secured to the axle at points above the axle and also hinged to said plate.

10. The combination with the body-supporting side rails, rear axle and loop-shackles on the rear axle, of springs fixed to the side rails and having a sliding engagement with said loop-shackles beneath the axle, plates secured to the springs at points forward of the axle and braces formed integral with the loop-shackles hinged to the said plates.

In testimony that I claim the foregoing as my invention I have signed my name, in presence of two witnesses, this 22d day of January, 1904.

MARTIN L. SENDERLING.

Witnesses:
 FREDK. HAYNES,
 HENRY THIEME.